US012771166B2

(12) United States Patent
Krishnan Kutty et al.

(10) Patent No.: US 12,771,166 B2
(45) Date of Patent: Oct. 20, 2026

(54) TRANSFER SWITCH FOR MULTIPLE POWER SOURCES AND MULTIPLE ELECTRICAL LOADS

(71) Applicant: Caterpillar Inc., Peoria, IL (US)

(72) Inventors: Prajod Krishnan Kutty, Palakkad District (IN); Firoz Ahamed, Bengaluru (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/636,863

(22) Filed: Apr. 16, 2024

(65) Prior Publication Data

US 2025/0323522 A1 Oct. 16, 2025

(51) Int. Cl.
*H02J 9/06* (2006.01)
*H02J 3/007* (2026.01)

(52) U.S. Cl.
CPC .............. *H02J 9/068* (2020.01); *H02J 3/007* (2020.01)

(58) Field of Classification Search
CPC ............... H02J 9/068; H02J 3/007; H02J 3/14
See application file for complete search history.

(56) References Cited

U.S. PATENT DOCUMENTS

2007/0132317 A1* 6/2007 Willets .................... H02J 9/062 307/66
2008/0258557 A1* 10/2008 Lathrop .................... H02J 3/14 307/25
2010/0019574 A1* 1/2010 Baldassarre .............. H02J 9/06 307/64
2011/0187197 A1* 8/2011 Moth ...................... H02J 9/062 307/66
2012/0086576 A1* 4/2012 Lin ......................... H02J 9/065 362/20
2014/0054965 A1* 2/2014 Jain ......................... H02J 9/062 307/65
(Continued)

FOREIGN PATENT DOCUMENTS

WO 2021195509 A2 9/2021

OTHER PUBLICATIONS

Written Opinion and International Search Report for Int'l. Patent Appln. No. PCT/US2025/022859, mailed Aug. 6, 2025 (12 pgs).

*Primary Examiner* — Rexford N Barnie
*Assistant Examiner* — Rasem Mourad
(74) *Attorney, Agent, or Firm* — Harrity & Harrity LLP

(57) ABSTRACT

A controller may monitor measurements taken by a sensor configured to measure an environmental condition. The controller may cause, provided that one or more of the measurements fail to satisfy a threshold, connection of the secondary power source to a load that is configured to provide conditioning of the environmental condition. The controller may detect that a measurement, of the measurements taken by the sensor, satisfies the threshold. The measurement satisfying the threshold may indicate that the load has sufficiently conditioned the environmental condition. The controller may cause, responsive to the measurement satisfying the threshold, activation of a primary electrical system that includes a primary power source. The controller may cause, responsive to activation of the primary electrical system, connection of the primary power source to one or more additional loads.

20 Claims, 3 Drawing Sheets

(56) References Cited

U.S. PATENT DOCUMENTS

| | | | | |
|---|---|---|---|---|
| 2015/0168976 | A1* | 6/2015 | Loucks | H02J 9/061 700/287 |
| 2017/0089763 | A1* | 3/2017 | Freer | G01J 5/0096 |
| 2018/0278086 | A1 | 9/2018 | Hall et al. | |
| 2019/0089160 | A1 | 3/2019 | Besser et al. | |
| 2021/0099011 | A1* | 4/2021 | Hermans | H05B 47/105 |
| 2021/0111646 | A1 | 4/2021 | Rubin | |
| 2022/0385102 | A1* | 12/2022 | Pu | H02J 9/062 |
| 2023/0291206 | A1 | 9/2023 | Winter et al. | |

* cited by examiner

TRANSFER SWITCH FOR MULTIPLE POWER SOURCES AND MULTIPLE ELECTRICAL LOADS

TECHNICAL FIELD

The present disclosure relates generally to electrical systems and, for example, to a transfer switch for multiple power sources and multiple electrical loads.

BACKGROUND

A power system (e.g., a battery energy storage system) may include an electrical load, such as a fire suppression system, that should have a highest-possible uptime. Multiple redundant power sources may be used to keep such an electrical load continually active. Moreover, the power system may employ a transfer switch that is used to automatically switch between the multiple power sources based on their availability. Generally, a transfer switch may be configured to handle power source switching for a single load based on power supply interruptions.

International Application Publication No. WO2021195509 (the '509 publication) discloses an automatic transfer switch (ATS) for automatically switching an electrical load between two power sources. The '509 publication indicates that an ATS unit can be equipped with connections for sensors such as environmental (temperature, humidity, moisture present, smoke detection), safety (door lock status, moisture present, smoke detection) or other sensor types. The ATS unit can report any or all the information gathered to a remote electronic data processing apparatus, where it can be processed, displayed and acted upon. The '509 publication does not address using sensor data relating to environmental conditions to inform switching between power sources used to power conditioning loads that condition the environment.

The transfer switch of the present disclosure solves one or more of the problems set forth above and/or other problems in the art.

SUMMARY

A switching system may include a switching module connected to multiple power sources and to multiple electrical loads. The multiple power sources may include a primary power source and a secondary power source. The switching module may be configured to electrically connect one or more of the multiple power sources to one or more of the multiple electrical loads. The switching system may include a sensor configured to measure an environmental condition. The switching system may include a controller communicatively coupled to the switching module and the sensor. The controller may be configured to monitor measurements taken by the sensor. The controller may be configured to cause, via the switching module and provided that one or more of the measurements fail to satisfy a threshold, connection of the secondary power source to a load, of the multiple electrical loads, that is configured to provide conditioning of the environmental condition. The controller may be configured to detect that a measurement, of the measurements taken by the sensor, satisfies the threshold. The controller may be configured to cause, via the switching module and responsive to the measurement satisfying the threshold, connection of the primary power source to the load and one or more additional loads of the multiple electrical loads.

A method of controlling electrical power supply from a primary power source and a secondary power source to multiple electrical loads may include monitoring, by a controller, measurements taken by a sensor configured to measure an environmental condition. The method may include causing, by the controller and provided that one or more of the measurements fail to satisfy a threshold, connection of the secondary power source to a load, of the multiple electrical loads, that is configured to provide conditioning of the environmental condition. The method may include detecting, by the controller, that a measurement, of the measurements taken by the sensor, satisfies the threshold, the measurement satisfying the threshold indicating that the load has sufficiently conditioned the environmental condition. The method may include causing, by the controller and responsive to the measurement satisfying the threshold, activation of a primary electrical system that includes the primary power source. The method may include causing, by the controller and responsive to activation of the primary electrical system, connection of the primary power source to one or more additional loads of the multiple electrical loads.

An electrical system may include multiple power sources including a primary power source internal to a container and a secondary power source external to the container. The electrical system may include multiple electrical loads. The electrical system may include a switching system including a sensor configured to measure an environmental condition relating to the container, and a controller communicatively coupled to the sensor. The controller may be configured to monitor measurements taken by the sensor. The controller may be configured to cause connection of the secondary power source to a load, of the multiple electrical loads, that is configured to provide conditioning of the environmental condition. The controller may be configured to detect that a measurement, of the measurements taken by the sensor, satisfies a threshold. The controller may be configured to cause, responsive to the measurement satisfying the threshold, connection of the primary power source to the load and one or more additional loads of the multiple electrical loads.

DETAILED DESCRIPTION

This disclosure relates to a transfer switch, which is applicable to any electrical system that utilizes multiple power sources and multiple electrical loads.

Figure 1:
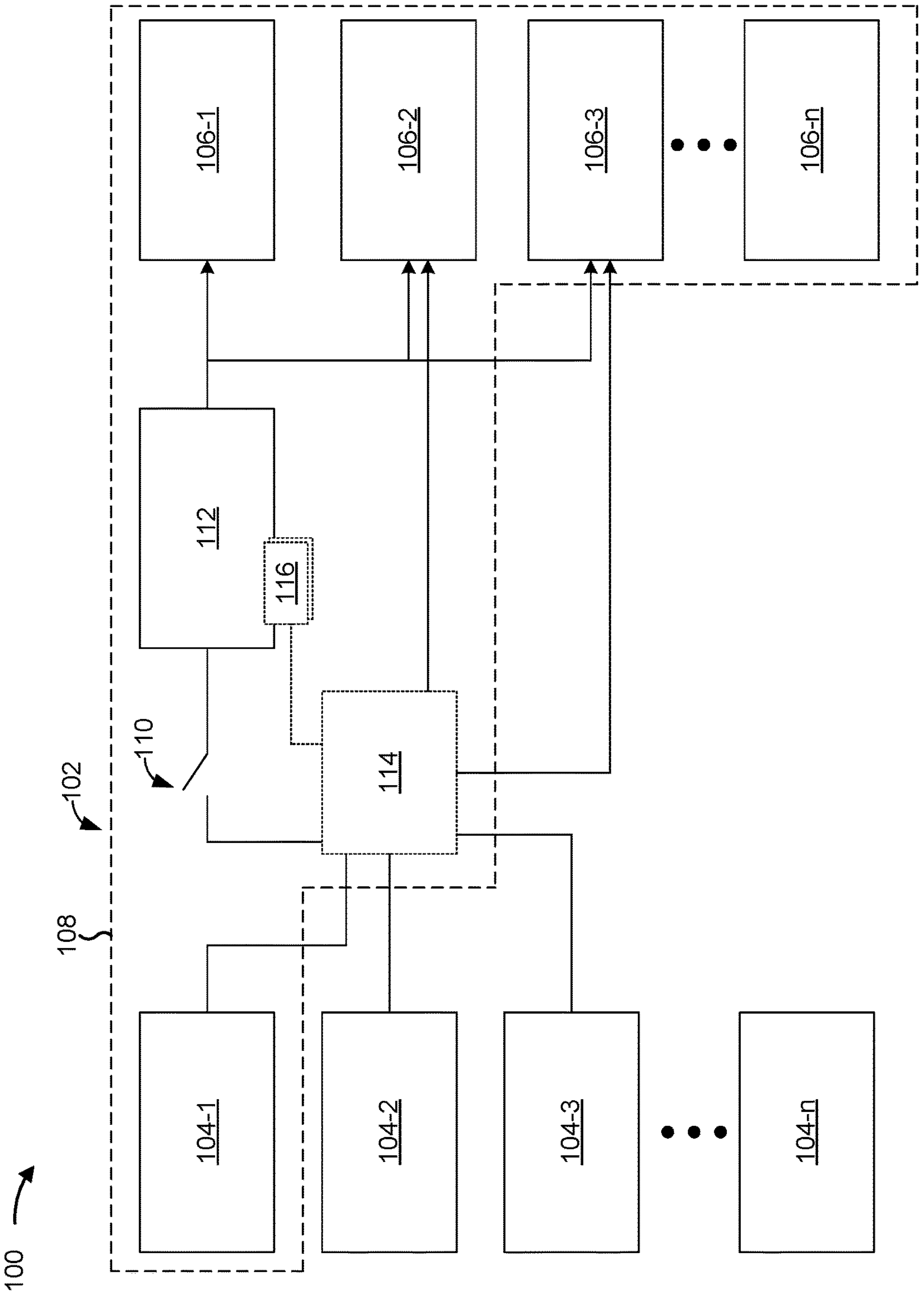
FIG. 1 is a diagram illustrating an example electrical system.

FIG. 1 is a diagram illustrating an example electrical system 100. The electrical system 100 includes a power system 102. The power system 102 may be an energy storage system (e.g., a battery energy storage system), a generator set (genset), or a fuel cell system, among other examples. The power system 102 includes a primary power source 104-1 (e.g., internal battery power) and multiple electrical loads 106 (shown as 106-1 through **106-*n*). The primary power source 104-1 is an internal power source of the power system 102. For example, the primary power source 104-1 may be disposed in a container 108 of the power system 102. The container 108 may include one or more doors (not shown) for access to a compartment of the container 108 in which the primary power source 104-1 is housed. The primary power source 104-1 and the electrical loads 106 may be co-located. For example, the electrical loads 106 may be disposed in the container 108 (e.g., in the compartment with the primary power source 104-1), mounted on the container 108, and/or placed outside the container 108**.

In some implementations, the power system 102 includes a power electronics cabinet (e.g., including one or more power converters), one or more power transformers, or the like, which may be disposed in the container 108 (e.g., in the compartment with the primary power source 104-1). The primary power source 104-1, a circuit breaker 110, and a primary electrical panel 112, which is electrically connected to the electrical loads 106, may be components of a primary electrical system of the power system 102.

The primary power source 104-1 may include one or more batteries (e.g., when the power system 102 is an energy storage system), an electrical generator (e.g., when the power system 102 is a genset), and/or one or more fuel cells (e.g., when the power system 102 is a fuel cell system), among other examples. The electrical loads 106 may include one or more non-critical loads 106-1, one or more conditioning (e.g., preconditioning) loads 106-2, and/or one or more emergency-use loads 106-3.

The conditioning loads 106-2 are configured to provide conditioning to one or more environmental conditions (e.g., ambient conditions) associated with the power system 102. For example, the environmental conditions may be inside the container 108, inside the primary electrical panel 112, or the like. The environmental conditions may relate to temperature, pressure, and/or humidity, among other examples. Accordingly, the conditioning loads 106-2 may include one or more heater systems (e.g., a cold-weather kit), one or more ventilation systems, one or more compressors, and/or one or more fans, among other examples. The emergency-use loads 106-3 may be configured to provide remediation in an emergency situation involving the power system 102, such as a situation involving a fire, high smoke levels, or the like. Accordingly, the emergency-use loads 106-3 may include one or more fire-suppression systems, one or more pressure venting systems, or the like. The non-critical loads 106-1 (e.g., loads, that if online, would not result in a safety hazard) may include any loads that are not conditioning loads 106-2 or emergency-use loads 106-3, such as one or more lighting systems, one or more heating, ventilation, and air conditioning (HVAC) systems, one or more pumps, or the like.

In addition to the primary power source 104-1 of the power system 102, the electrical system 100 may include one or more additional power sources (shown as power sources 104-2 through **104-*n*). For example, the electrical system 100 may include a secondary power source 104-2 (e.g., external battery power) and/or an emergency-use power source 104-3. The secondary power source 104-2 is an external power source from the power system 102. The secondary power source 104-2 may include a utility grid, an electrical generator, and/or a renewable power source (e.g., one or more solar panels, one or more wind turbines, or the like). The emergency-use power source 104-3 may be an external power source from the power system 102. The emergency-use power source 104-3** may include an electrical generator and/or an uninterruptible power supply (UPS), among other examples.

Figure 2:
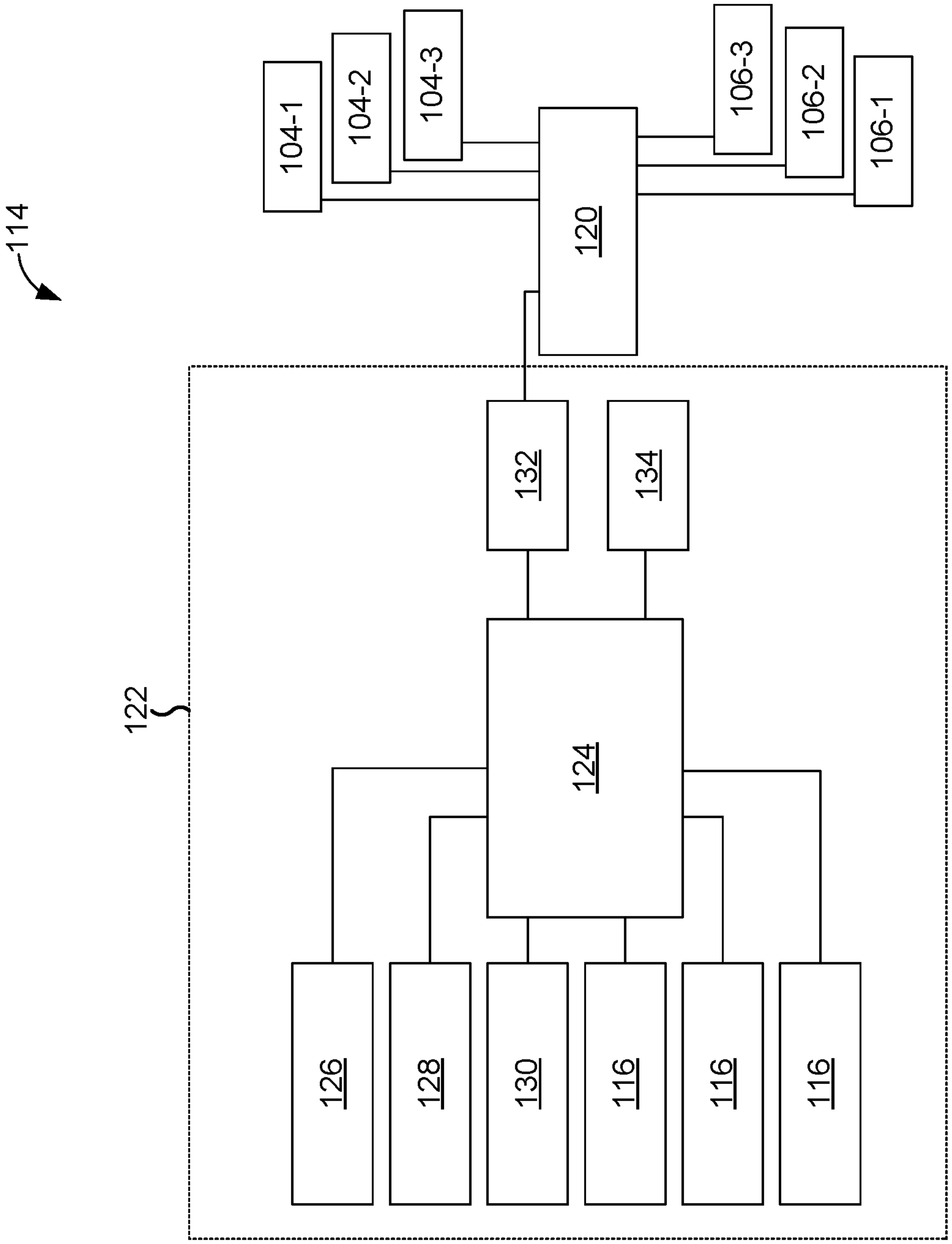
FIG. 2 is a diagram illustrating an example switching system.

The electrical system 100 further includes a switching system 114, described further in FIG. 2. As shown in FIG. 1, the switching system 114 may include one or more sensors 116. The sensors 116 may be configured to measure one or more environmental conditions (e.g., temperature, pressure, and/or humidity, among other examples) relating to the container 108 and/or relating to the primary electrical panel 112. For example, the sensors 116 may be positioned in or on the primary electrical panel 112. The sensors 116 may include one or more temperature sensors (e.g., thermocouples), one or more pressure sensors, one or more humidity sensors, one or more noise (e.g., decibel) sensors, one or more flowrate sensors (e.g., relating to liquid-cooling systems), one or more safety sensors (e.g., smoke sensors, carbon monoxide sensors, or the like), and/or one or more proximity sensors (e.g., to detect whether a door has an open position or a closed position), among other examples.

As indicated above, FIG. 1 is provided as an example. Other examples may differ from what is described with regard to FIG. 1.

FIG. 2 is a diagram illustrating an example switching system 114. The switching system 114 includes a switching module 120 and a transfer switch 122 (e.g., a transfer switch unit). Components of the switching module 120 and/or the transfer switch 122 may be internal and/or external to the power system 102. For example, components of the switching module 120 and/or the transfer switch 122 may be disposed in the container 108 (e.g., in the compartment with the primary power source 104-1), mounted on the container 108, and/or placed outside the container 108. In some implementations, one or more components of the transfer switch 122 may be contained in a housing (that defines a transfer switch unit).

The switching module 120 is electrically connected to the multiple power sources 104 and to the multiple electrical loads 106. The switching module 120 is configured to control electrical power supply from the multiple power sources 104 to the multiple electrical loads 106. For example, the switching module 120 is configured to electrically connect one or more of the power sources 104 to one or more of the electrical loads 106. The switching module 120 may include one or more switches to control power supply. For example, the switching module 120 may include a solid-state switching component (e.g., to produce reduced switching times, such as less than 20 milliseconds). The solid-state switching component may be contactor-based (e.g., may include one or more contactors), thyristor-based (e.g., may include one or more thyristors), or the like.

The transfer switch 122 may include a controller 124 (e.g., a microcontroller board) that is communicatively connected to a wireless communication device 126, a power supply component 128, a manual source control switch 130, and one or more sensors 116. The wireless communication device 126 provides wireless connectivity for the transfer switch 122 (e.g., Internet of Things (IoT) connectivity), to facilitate communication between the controller 124 and a control system remote from the power system 102 (e.g., a cloud computing system, a back-office system, a remote control device, or the like). The wireless communication device 126 may be configured to communicate using a wireless personal area network (WPAN) technology (e.g., Bluetooth), a wireless local area network (WLAN) technology (e.g., WiFi), or the like.

Thus, the wireless communication device 126 facilitates WPAN-based, WLAN-based, cloud-based, or the like, control of the transfer switch 122, thereby allowing remote operation and touchless control of the transfer switch 122 (e.g., which is useful in high-voltage applications). In some implementations, the controller 124 may receive from the control system, via the wireless communication device 126, a command (e.g., initiated manually by a user) to switch between power sources 104 for the multiple electrical loads 106. In some implementations, the controller 124 may monitor a status or state of the power sources 104 and/or the electrical loads 106, and transmit to the control system, via the wireless communication device 126, information indicating the status or state of the power sources 104 and/or the electrical loads 106.

The power supply component 128 (e.g., a power supply board and/or buck converter) is configured to supply power to the controller 124 and other components of the transfer switch 122. The power supply component 128 may include a battery or another power source, independent from the power sources 104. The manual source control switch 130 is configured to allow manual switching between power sources 104 and electrical loads 106 (e.g., in low-voltage applications). As described herein, the one or more sensors 116 may include one or more thermocouples, one or more proximity sensors, or the like. In addition, the transfer switch 122 may include one or more digital and/or analog input/output (I/O) ports to facilitate connection of additional sensors 116 (e.g., one or more pressure sensors, one or more humidity sensors, or the like).

The transfer switch 122 may further include a coupling component 132 and a user interface component 134. The coupling component 132 is configured to communicatively connect the controller 124 and the switching module 120, thereby allowing the controller 124 to control switching operations of the switching module 120. In some examples, the coupling component 132 may facilitate wireless communication between the controller 124 and the switching module 120. For example, the coupling component 132 may include an optocoupler module (e.g., an optocoupler circuit or an opto-isolator). As an example, the transfer switch 122 may include a light-emitting component, and the switching module 120 may include a light-detecting component, thereby allowing electrical signals to be transferred from the controller 124 to the switching module 120 using light. In this way, the coupling component 132 may isolate the low-voltage transfer switch 122 from the high-voltage power sources 104 and electrical loads 106, thereby reducing the effect that electromagnetic interference (EMI) and/or noise generated by high-voltage components will have on the low-voltage transfer switch 122.

The user interface component 134 may allow a user to update settings of the transfer switch 122, control manual switching of the transfer switch 122, or the like. The user interface component 134 may include a human-machine interface (HMI), a touchscreen input device, a keypad, or the like.

The controller 124 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may be a non-transitory computer-readable medium. The memory may store information, one or more instructions, and/or software (e.g., one or more software applications) related to the operation of the controller 124.

The controller 124 may store a dataset that indicates operable ranges (e.g., minimum allowed values and/or maximum allowed values) for one or more environmental conditions. For example, the dataset may indicate a first operable range (e.g., defined by one or more thresholds) for temperature, a second operable range (e.g., defined by one or more thresholds) for humidity, and so forth. Various components of the power system 102 (e.g., the primary power source 104-1) may have a diminished performance when the environmental conditions are outside of the operable ranges (e.g., battery charging or discharging may be affected by cold temperatures). The dataset may be configured by a user and may be updated from time to time.

The controller 124 may monitor measurements taken by the sensors 116. For example, to monitor the measurements, the controller 124 may receive sensor data from the sensors 116, and may compare the sensor data to the dataset stored by the controller 124 to identify whether the sensor data satisfies thresholds associated with the operable ranges indicated by the dataset. Provided that the measurements (e.g., one or more of the measurements) fail to satisfy the thresholds, the controller 124 may cause, via the switching module 120, connection of the secondary power source 104-2 to the conditioning load(s) 106-2 (e.g., the controller 124 may cause switching of the conditioning load(s) 106-2 to the secondary power source 104-2). For example, because the environmental conditions are not suitable for using the primary electrical system of the power system 102, the conditioning load(s) 106-2 may be powered by the secondary power source 104-2, which is external to the power system 102. When powered, the conditioning load(s) 106-2 may begin conditioning the environmental conditions toward the operable ranges.

While the conditioning load(s) 106-2 are being powered by the secondary power source 104-2, the emergency-use load(s) 106-3 may be connected to, and/or powered by, the secondary power source 104-2 or the emergency-use power source 104-3. For example, the controller 124 may be configured to ensure that the emergency-use load(s) 160-3 are consistently powered by one of the power sources 104 (e.g., the most optimal of the power sources 104).

While monitoring the measurements taken by the sensors 116, the controller 124 may detect that the measurements (e.g., one or more of the measurements) satisfy the thresholds. The measurements satisfying the thresholds may indicate that the conditioning load(s) 106-2 have sufficiently conditioned the environmental conditions. For example, temperature measurements satisfying a temperature threshold may indicate that the temperature has been conditioned to an operable range for the power system 102, humidity measurements satisfying a humidity threshold may indicate that the humidity has been conditioned to an operable range for the power system 102, and so forth.

Responsive to the measurements satisfying the thresholds, the controller 124 may cause activation of the primary electrical system of the power system 102 (e.g., by causing, via an activation signal, closing of the circuit breaker 110). In addition, responsive to the measurements satisfying the thresholds and/or to the activation of the primary electrical system, the controller 124 may cause, via the switching module, connection of the primary power source 104-1 to the non-critical loads 106-1, the conditioning loads 106-2, and the emergency-use loads 106-3 (e.g., the controller 124 may cause switching of the non-critical loads 106-1, the conditioning loads 106-2, and the emergency-use loads 106-3 to the primary power source 104-1). Thus, once the environmental conditions have been sufficiently conditioned by the conditioning loads 106-2, the primary power source 104-1 can begin to power the loads 106.

While the emergency-use load(s) 106-3 are connected to the primary power source 104-1 (e.g., after the primary electrical system is activated), the controller 124 may detect an interruption to a power supply to the emergency-use load(s) 106-3 (e.g., the controller 124 may detect that the emergency-use load(s) 106-3 are not energized). Responsive to the interruption to the power supply, the controller 124 may cause, via the switching module 120, connection of the emergency-user power source 104-3 to the emergency-use load(s) 106-3.

In some implementations, while the emergency-use load (s) 106-3 are connected to the secondary power source 104-2 (e.g., before the primary electrical system is activated) or to the primary power source 104-1 (e.g., after the primary electrical system is activated), the controller 124 may detect an emergency environmental condition (e.g., an environmental condition, such as smoke level, carbon monoxide level, or temperature, has reached a level associated with an emergency situation). For example, the controller 124 may detect that measurements taken by one or more sensors 116 satisfy an emergency threshold (e.g., an emergency smoke level threshold, an emergency carbon monoxide level threshold, or an emergency temperature threshold). Responsive to the emergency environmental condition, the controller 124 may cause, via the switching module 120, connection of the emergency-use power source 104-3 to the emergency-use load(s) 106-3 to ensure that the emergency-use load(s) 106-3 remain powered during an emergency situation.

As indicated above, FIG. 2 is provided as an example. Other examples may differ from what is described with regard to FIG. 2.

Figure 3:
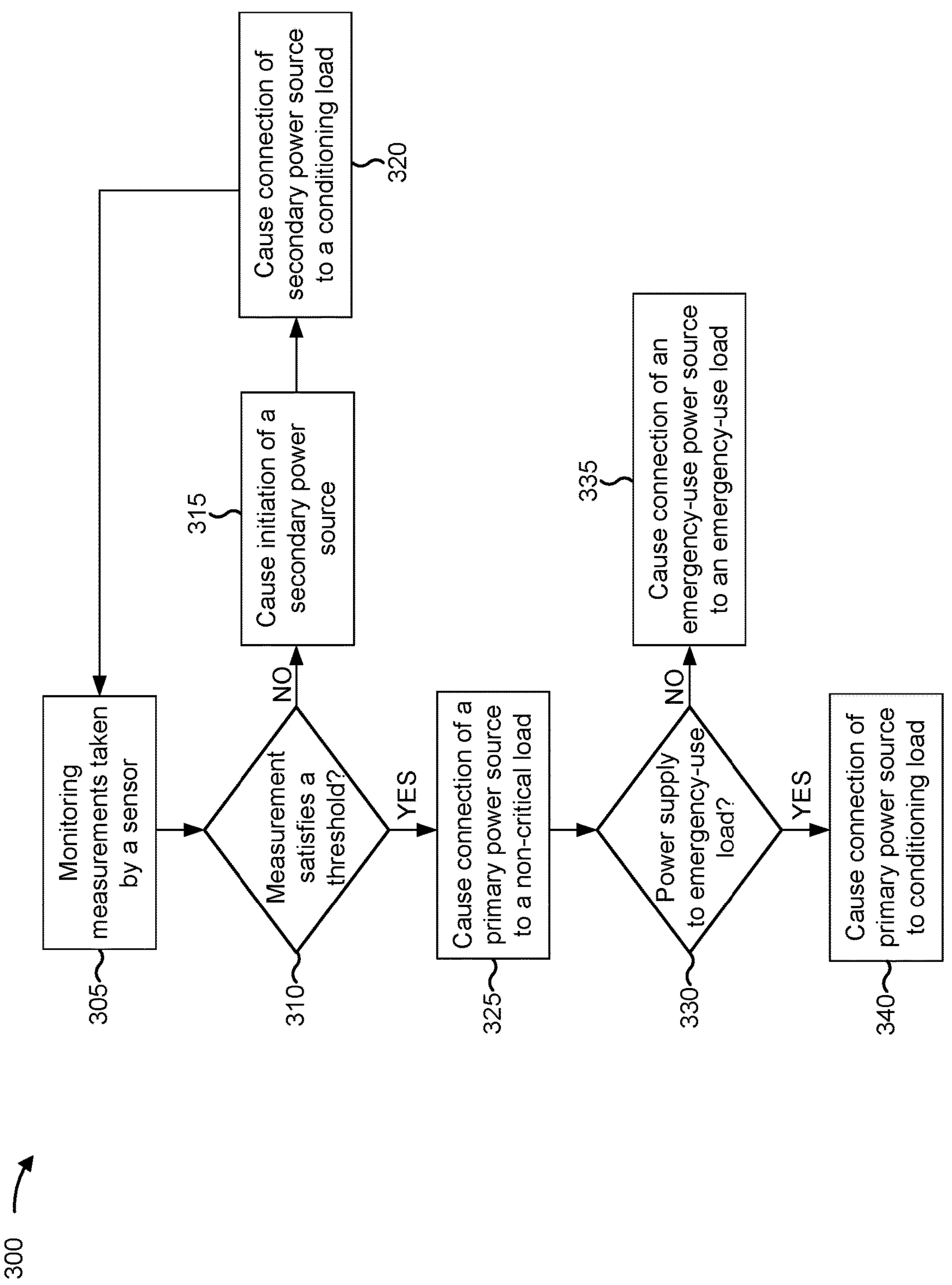
FIG. 3 is a flowchart of an example process associated with power transfer among multiple power sources and multiple electrical loads.

FIG. 3 is a flowchart of an example process 300 associated with power transfer among multiple power sources and multiple electrical loads. One or more process blocks of FIG. 3 may be performed by a controller (e.g., controller 124). Additionally, or alternatively, one or more process blocks of FIG. 3 may be performed by another device or a group of devices separate from or including the controller, such as another device or component that is internal or external to the power system 102.

As shown in FIG. 3, process 300 may include monitoring measurements taken by a sensor (block 305). For example, the controller (e.g., using a memory and/or a processor) may monitor the measurements. In an example, the controller may review real-time datasets from various sensors (e.g., a temperature sensor, a pressure sensor, a flowrate sensor, a noise sensor, a humidity sensor, and/or a safety sensor, among other examples), and compare the real-time datasets to a pre-defined dataset stored by the controller (e.g., compare values collected by a sensor to one or more stored values particular to that sensor).

Process 300 may include detecting whether a measurement satisfies a threshold (block 310). For example, the controller (e.g., using a memory and/or a processor) may detect whether a measurement satisfies a threshold. In an example, the controller may determine whether instantaneous data collected by the sensors equals data stored in the controller.

Based on detecting that the measurement fails to satisfy the threshold (block 310-NO), process 300 may include causing initiation of a secondary power source (block 315) and causing connection of the secondary power source to a conditioning load (block 320). For example, the controller (e.g., using a memory, a processor, and/or a communication component) may cause initiation of the secondary power source, and the controller (e.g., using a memory, a processor, a coupling component, and/or a switching module) may cause connection of the secondary power source to a conditioning load. In an example, to cause connection of the secondary power source to the conditioning load, the controller may cause switching of the conditioning load to the secondary power source (e.g., an external power source). Process 300 may then return to block 305.

Based on detecting that the measurement satisfies the threshold (block 310—YES), process 300 may include causing connection of a primary power source to a non-critical load (block 325). For example, the controller (e.g., using a memory, a processor, a coupling component, and/or a switching module) may cause connection of a primary power source to a non-critical load. In an example, the controller may cause transferring of one or more non-critical loads (e.g., main loads) to the primary power source (e.g., an internal power source). Process 300 may include detecting whether there is a power supply to an emergency-use load (block 330). For example, the controller (e.g., using a memory and/or a processor) may detect whether there is a power supply to an emergency-use load. In an example, the controller may determine whether one or more emergency-use loads are energized.

Based on detecting that there is no power supply to the emergency-use load (block 330-NO), process 300 may include causing connection of an emergency-use power source to the emergency-use load (block 335). For example, the controller (e.g., using a memory, a processor, a coupling component, and/or a switching module) may cause connection of an emergency-use power source to the emergency-use load. In an example, the controller may cause transferring of one or more emergency-use loads to the emergency-use power source.

Based on detecting that there is the power supply to the emergency-use load (block 330—YES), process 300 may include causing connection of the primary power source to the conditioning load (block 340). For example, the controller (e.g., using a memory, a processor, a coupling component, and/or a switching module) may cause connection of the primary power source to the conditioning load. In an example, the controller may cause transferring of one or more conditioning loads to the primary power source (e.g., an internal power source).

Although FIG. 3 shows example blocks of process 300, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The transfer switch described herein may be used with any electrical system that includes multiple power sources and multiple electrical loads. For example, the transfer switch may be used with a power system, such as an energy storage system, a genset, or a fuel cell system, that utilizes multiple power sources and includes multiple electrical loads. In particular, the transfer switch may be used with a power system that includes one or more non-critical loads, one or more conditioning loads, and one or more emergency-use loads. Generally, a transfer switch may be configured to handle power source switching for a single load based on power supply interruptions. However, such transfer switches lack compatibility with multiple electrical loads and are not suitable for handling power source switching in scenarios other than power supply interruptions.

The transfer switch described herein is useful for switching between multiple power sources and multiple electrical loads based on various operating conditions. For example, the transfer switch may switch between multiple power sources and multiple electrical loads in an efficient manner based on environmental conditions as well as power supply interruptions. In some cases, various components of a power system may be diminished or non-functioning when environmental conditions are outside of operable ranges (e.g., battery charging or discharging may be affected by cold temperatures). The transfer switch provides for switching of conditioning loads between a primary power source and a secondary power source to facilitate conditioning of environmental conditions using the secondary power source when the primary power source cannot be used due to harsh environmental conditions. Moreover, the transfer switch provides for switching of emergency-use loads to an emergency-use power source in response to the primary power source and the secondary power source being unavailable, thereby ensuring high uptimes of the emergency-use loads.

The power sources and electrical loads may be associated with high voltage, which can generate EMI and/or noise that can affect low-voltage circuitry associated with the transfer switch. Accordingly, the transfer switch may include a coupling component (e.g., an optocoupler) that facilitates wireless communication between the transfer switch and a switching module connected to the power sources and the electrical loads. The coupling component electrically isolates the transfer switch from the high voltage components, thereby reducing the effect of EMI and/or noise and improving a performance of the transfer switch. Moreover, the transfer switch may include a wireless communication device to enable communication between the transfer switch and an offboard control system. Using the control system, power source switching performed by the transfer switch can be wirelessly controlled. In this way, manual control of the transfer switch can be achieved in a touchless manner, thereby avoiding human interaction with high voltage components.

What is claimed is:

1. A switching system, comprising:

a switching module connected to a plurality of power sources and a plurality of electrical loads, wherein the plurality of power sources includes a first power source, a second power source, and a third power source, and wherein the switching module being configured to electrically connect the plurality of power sources to the plurality of electrical loads;

one or more sensors configured to measure one or more environmental conditions; and a controller, coupled to the switching module and the one or more sensors, configured to:

monitor measurements taken by the one or more sensors;

compare a first measurement, of the measurements, to a dataset defining one or more operable ranges for the one or more environmental conditions, wherein each of the one or more operable ranges corresponds to a different environmental condition of the one or more environmental conditions;

determine, based on the comparison, the first measurement fails to satisfy a first threshold associated with a first operable range of the one or more operable ranges; cause, via the switching module and responsive to determining that the first measurement fails to satisfy the first threshold, connection of the second power source to the plurality of electrical loads, wherein the plurality of electrical loads includes a first electrical load is configured to provide conditioning of a first environmental condition of the one or more environmental conditions;

detect, responsive to causing the connection of the second power source to the plurality of electrical loads, that a second measurement, of the measurements, fails to satisfy an emergency threshold associated with an emergency environmental condition of the one or more environmental conditions;

cause, via the switching module and responsive to detecting the second measurement fails to satisfy the emergency threshold, connection of the third power source to a second electrical load of the plurality of electrical loads, wherein the third power source is configured to exclusively power the second electrical load;

determine, responsive to causing connection of third power source to the second electrical load, a third measurement, of the measurements, satisfying the first threshold; and cause, via the switching module and responsive to the determining the third measurement satisfying the first threshold, connection of the first power source to the first electrical load and the second electrical load.

2. The switching system of claim 1, wherein the third power source is an emergency-use power source.

3. The switching system of claim 2, wherein the second electrical load is an emergency-use load.

4. The switching system of claim 1, wherein the controller is coupled to the switching module via an optocoupler.

5. The switching system of claim 1, wherein the controller is further configured to:

receive, via a wireless communication device coupled to the controller, configuration data from a user that updates the dataset, wherein comparing the measurements occurs after the dataset is updated.

6. The switching system of claim 1, wherein the controller is further configured to:

cause, via the switching module and responsive to determining the third measurement satisfying the first threshold, activation of an electrical panel, electrically connected to the plurality of electrical loads, and a circuit breaker, electrically connected to the switching module and the electrical panel.

7. The switching system of claim 1, wherein the switching module comprises one or more contactors or one or more thyristors.

8. The switching system of claim 1, wherein the dataset defines operable ranges for a plurality of different environmental conditions including at least two of temperature, humidity, or pressure.

9. The switching system of claim 1, wherein:
the second power source comprises at least one of a utility grid, an electric generator, or a renewable power source, or
the third power source comprises at least one of an electrical generator or an uninterruptible power supply.

10. The switching system of claim 1, further comprising:
a transfer switch comprising the controller, the one or more sensors, and a light-emitting component configured to transmit electrical signals associated with causing connection of the second power source to the plurality of electrical loads, causing connection of the third power source to the second electrical load, and causing connection of the first power source to the first electrical load and the second electrical load,
wherein the switching module comprises a light-detecting component configured to receive the electrical signals.

11. A method of controlling electrical power supply from a plurality of power sources to a plurality of electrical loads, comprising:
monitoring, by a controller and while a first power source of the plurality of power sources is connected to the plurality of electrical loads, measurements taken by one or more sensors configured to measure one or more environmental conditions;
comparing, by the controller, a first measurement, of the measurements, to a dataset defining one or more operable ranges for the one or more environmental conditions, wherein each of the one or more operable ranges corresponds to a different environmental condition of the one or more environmental conditions;
determining, by the controller, that the first measurement fails to satisfy a first threshold associated with a first operable range of the one or more operable ranges;
causing, by the controller and responsive to determining that the first measurement fails to satisfy the first threshold, connection of a second power source, of the plurality of power sources, to the plurality of electrical loads, wherein the plurality of electrical loads includes a first electrical load is configured to provide conditioning of a first environmental condition of the one or more environmental conditions;
detecting, by the controller and responsive to causing the connection of the second power source to the plurality of electrical loads, that a second measurement, of the measurements, fails to satisfy an emergency threshold associated with an emergency environmental condition;
causing, by the controller and responsive to detecting the second measurement fails to satisfy the emergency threshold, connection of a third power source, of the plurality of power sources, to a second electrical load of the plurality of electrical loads, wherein the third power source is configured to exclusively power the second electrical load;
determining, via the controller and responsive to causing connection of the third power source to the second electrical load, a third measurement, of the measurements, satisfying the first threshold; and
causing, by the controller and responsive to determining the third measurement satisfying the first threshold, connection of the first power source to the plurality of electrical loads.

12. The method of claim 11,
wherein the second electrical load is an emergency-use load.

13. The method of claim 11,
wherein the first environmental condition is temperature, pressure, or humidity.

14. An electrical system, comprising:
a container comprising a primary power source and multiple electrical loads;
multiple power sources including the primary power source and a secondary power source, wherein the secondary power source is external to the container; and
a switching system, comprising:
a plurality of sensors configured to measure a plurality of environmental conditions relating to the container; and
a controller, coupled to the plurality of sensors, configured to:
cause connection of the secondary power source to the multiple electrical loads, wherein the multiple electrical loads include a first electrical load configured to provide conditioning of a first environmental condition of the plurality of environmental conditions, and a second electrical load configured to provide conditioning of a second environmental condition of the plurality of environmental conditions, wherein the second environmental condition is different from the first environmental condition;
compare, after causing connection of the secondary power source to the multiple electrical loads:
a first measurement, taken by the plurality of sensors, to a first operable range, for the first environmental condition, of a stored dataset, and
a second measurement, taken by the plurality of sensors, to a second operable range, for the second environmental condition, of the stored dataset, wherein that second operable range is different from the first operable range;
determine that the first measurement satisfies a first threshold associated with the first operable range;
determine that the second measurement satisfies a second threshold associated with the second operable range;
determine, based on determining that the first measurement satisfies the first threshold and that the second measurement satisfies the second threshold, that operation of a primary electrical system including the primary power source is permitted;
activate, responsive to determining that the first measurement satisfying the first threshold and determining that the second measurement satisfying the second threshold, the primary electrical system; and
cause, responsive to activating the primary electrical system, connection of the primary power source to the multiple electrical loads.

15. The electrical system of claim 14,
wherein the switching system further comprises a switching module, coupled to the controller, configured to electrically connect the multiple power sources to the multiple electrical loads.

16. The electrical system of claim 14,
wherein the multiple power sources further include an emergency-use power source.

17. The electrical system of claim 16,
wherein the multiple electrical loads further include an emergency-use load, and
wherein the controller is further configured to:
detect an interruption of the primary power source to the emergency-use load; and
cause, responsive to the interruption of the primary power source, connection of the primary power source to the emergency-use load.

18. The electrical system of claim 14, wherein the plurality of sensors are configured to measure the plurality of environmental conditions at an electrical panel, in the container, that is electrically connected to the multiple electrical loads.

19. The electrical system of claim 14, wherein each of the first environmental condition and the second environmental condition is a heater system, a ventilation system, or a compressor.

20. The electrical system of claim 14, wherein the container further comprises the switching system.

* * * * *